United States Patent

Otani et al.

Patent Number: 5,956,449
Date of Patent: Sep. 21, 1999

[54] STRUCTURE FOR MOUNTING AN OPTICAL CIRCUIT

[75] Inventors: Hiroshi Otani; Shohei Tada, both of Tokyo, Japan

[73] Assignee: NEC Corporation, Tokyo, Japan

[21] Appl. No.: 08/922,700

[22] Filed: Sep. 2, 1997

[30] Foreign Application Priority Data

Feb. 26, 1997 [JP] Japan ...................................... 9-57193

[51] Int. Cl.⁶ ...................................................... G02B 6/00
[52] U.S. Cl. ........................................... 385/134; 385/135
[58] Field of Search ..................................... 385/134–136

[56] References Cited

U.S. PATENT DOCUMENTS

| | | | |
|---|---|---|---|
| 5,080,459 | 1/1992 | Wettengel et al. | 385/135 |
| 5,274,731 | 12/1993 | White | 385/135 |
| 5,519,804 | 5/1996 | Burek et al. | 385/135 |
| 5,734,776 | 3/1998 | Puetz | 385/134 |

FOREIGN PATENT DOCUMENTS 4-359202  12/1992  Japan .

*Primary Examiner*—Hemang Sanghavi
*Attorney, Agent, or Firm*—Scully, Scott Murphy & Presser

[57] ABSTRACT

In an optical circuit mounting structure of the present invention, a surface for mounting an optical circuit is implemented as three separate structural members (1, 2, 3) in the form of aluminum plates. The structural member (1, 2, 3) are connected together by hinges (7, 8). Optical parts (4), splices (5), connectors (6) for external lines and so forth are mounted on the circuit mounting surfaces of the structural members (1, 2, 3). The optical parts (4) are interconnected by optical fibers (9). The fibers (9) and their extra length portions (10) are affixed to the structural members (1, 2, 3) by fiber retainers 11. At the portions where the structural members (1, 2, 3) join each other, the fibers (9) intersect the axes of the hinges (7, 8) at an acute angle. After assemblage and adjustment, the structural members (1, 2, 3) are selectively folded upward and downward by 180 degrees about the associated flanges (7, 8) and then affixed together.

7 Claims, 5 Drawing Sheets

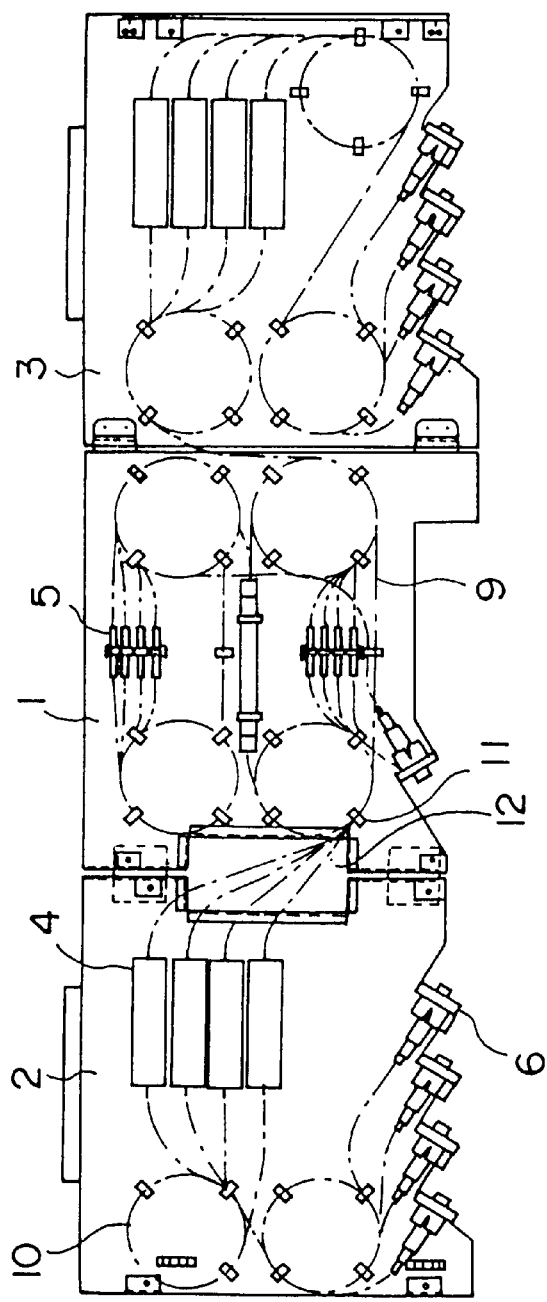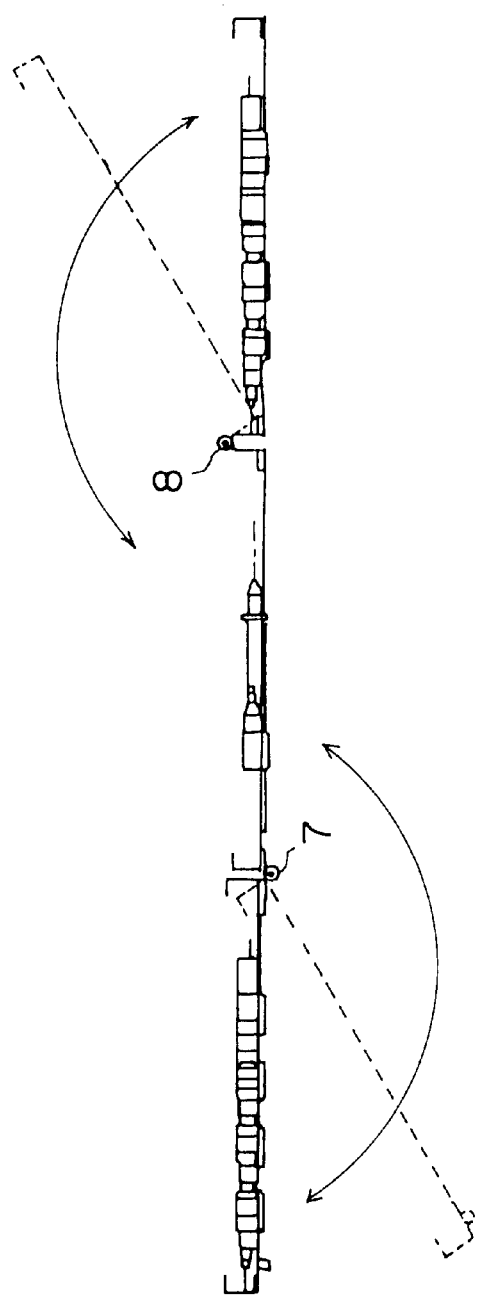
FIG. 1A
FIG. 1B

STRUCTURE FOR MOUNTING AN OPTICAL CIRCUIT

BACKGROUND OF THE INVENTION

1. Field of the Invention

The present invention relates to the structure of an optical communication apparatus and, more particularly, to a structure included in an optical communication apparatus for mounting an optical circuit.

2. Description of the Related Art

An optical circuit for the above application includes optical parts, optical fibers, splices and optical connectors. The optical circuit may additionally include photoelectric parts, an electric control circuit, Peltier elements for cooling, a Peltier driver, and a heat sink, as needed. These optical elements of the optical circuit are, in many cases, mounted on a single flat plate as far as possible. When all the optical elements as well as associated structural elements are mounted on a single flat plate, they are easy to assemble and adjust. Further, the optical fibers connecting the optical parts cannot be bent at acute angles, and must be laid with a radius of curvature greater than a preselected one. Generally, the minimum radius of curvature of the fibers must be 30 mm or above although it depends on the kind of the fibers. Therefore, arranging the optical circuit on a single flat plate additionally meets such a requirement relating to the optical fibers and facilitates the design of the optical circuit.

The optical circuit may be received in a box-like casing, as proposed in the past. The casing, or module, is sized, e.g., 10 cm×10 cm×1 cm or 20 cm×50 cm×3 cm. After all the optical parts and optical circuit have been arranged in the casing, the casing is closed by a protection cover. This kind of scheme protects the optical circuit from damage and promotes easy handling after assemblage.

In the above module structure, a surface for mounting the optical circuit is implemented as a single surface or as a plurality of surfaces. For a single mounting surface, use is made of a printed circuit board received in the casing or a surface corresponding to the protection cover. For a plurality of mounting surfaces, the inside of the casing is provided with a multilayer structure, e.g., a two-storied or three-storied structure. The multilayer structure reduces the widthwise and lengthwise dimensions of the module, but increases the thicknesswise dimension.

The optical parts, as distinguished from electrical parts, cannot be easily connected by a printed circuit board or the like, and must be connected by optical fibers in a network configuration. However, it is impossible to connect the optical parts by fibers whose length is the same as the distance between the optical parts, i.e., the fibers each needs an extra length. While the extra portions of the fibers must be rearranged and mounted, the prerequisite is that all the fibers including their extra portions be smoothly laid with a radius of curvature greater than the minimum radius of curvature. As a result, the total space for accommodating the extra portions of the fibers is equal to or even broader than the space for accommodating the optical parts.

Although the previously stated conventional mounting structures each takes account of the above characteristic of optical circuit mounting, they have the following problems left unsolved. When the entire optical circuit is mounted on a single surface, a mounting design matching with the above characteristic is achievable. However, the mounting area, as seen in a plan view, increases with an increase in the scale of the optical circuit. On the other hand, because the mounting space is limited by various conditions including the overall dimensions of an apparatus, the circuit scale is limited. Particularly, in parallel with the progress of optical communication technologies, an optical amplifier circuit and other circuits of the type using a wavelength multiplexing scheme or erbium doped fibers are increasing in scale. This type of optical fibers cannot be sufficiently coped with by the predominant arrangement in which the entire optical circuit is mounted on a single surface.

The module scheme with a multilayer structure is capable of coping with the increasing scale of the optical circuit. However, because each layer of the module is implemented by a sheet metal or similar structural member, the surface for mounting the optical circuit is divided into a first surface, second surface and so forth lying one above the other. The optical parts mounted on the consecutive layers or floors are interconnected by optical fibers. This connection is made permanent by splices involving a minimum of optical signal loss. Therefore, the connection between the consecutive layers is extremely difficult and restricted in the aspect of design and manual work. In addition, it is more difficult to disassemble, adjust or repair the completed module.

Japanese Patent Laid-Open Publication No. 4-359202 proposes a solution to the above problems. The solution consists in dividing a tray for receiving the extra portions of optical fibers into a plurality of trays. The adjacent trays are connected together by hinges at one side thereof. Such trays are stacked one upon the other in a shelf configuration, so that the top of a desired tray can be uncovered for easy access. This promotes easy assemblage and easy disassemblage, adjustment and repair after the assemblage.

However, the arrangement taught in the above document simply deals with the extra portions of optical fibers and does not pay attention to the connection between the consecutive layers or floors on which the optical circuit is mounted. Specifically, a number of optical fibers are permanently connected between the layers by splices. When the hinges are opened and closed in such a condition, the fibers must be protected from damage. Further, maintenance, e.g., removing a desired part from the structural member constituting the mounting surface without cutting the permanent connection is not practicable. Moreover, because the above hinge structure does not allow three or more layers to be opened at the same time, the assemblage must be manipulated layer by layer. For these reasons, the conventional hinge scheme is little better than the simple multilayer scheme as to design freedom and easy assemblage.

SUMMARY OF THE INVENTION

It is therefore an object of the present invention to provide an optical circuit mounting structure capable of enhancing the efficient and dense mounting of an optical circuit as well as easy assemblage thereof while satisfying the conditions relating to the connection of optical fibers, the radius of curvature of the fibers, and the extra portions of the fibers.

An optical circuit mounting structure of the present invention includes a plurality of structural members for mounting and affixing optical parts, optical fibers, splices and so forth. The structural members are connected together by a hinge structure. When the structural members are unfolded in a substantially flat position, their circuit mounting surfaces face the same side. The structural members are parallel to each other when folded.

In the event of assemblage, adjustment or maintenance, the structural members are unfolded and can be dealt with as if they were a single mounting surface. At the design stage, the unfolded mounting surfaces can be freely designed as if they were a single mounting surface, giving no special consideration to the assembling work. Further, at the time of use, the individual structural member is folded by 180 degrees in a compact configuration promoting efficient mounting. At this instant, the radius of curvature of optical fibers connecting the structural members greater than the minimum radius is guaranteed.

BRIEF DESCRIPTION OF THE DRAWINGS

The above and other objects, features and advantages of the present invention will become apparent from the following detailed description when taken with the accompanying drawings in which:

FIGS. 1A and 1B are respectively a plan view and a front view showing an optical circuit mounting structure embodying the present invention and held in an unfolded position;

Figure 2:
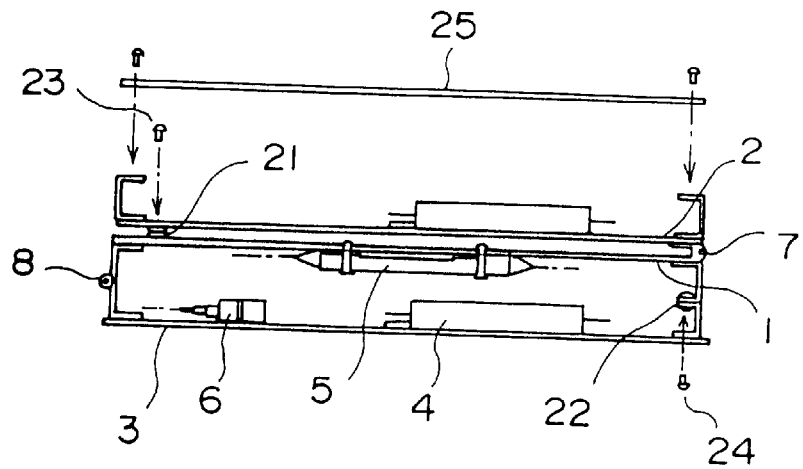
FIG. 2 is a front view showing the embodiment in a folded position.

In the drawings, identical references denote identical structural elements.

DETAILED DESCRIPTION OF THE PREFERRED EMBODIMENTS

Referring to FIGS. 1A and 1B, an optical circuit mounting structure embodying the present invention is shown and includes three separate structural members 1, 2 and 3. The structural members 1–3 are implemented by aluminum sheets and form three surfaces for mounting an optical circuit. The structural members 1 and 2 are connected by hinges 7. The hinges 7 are affixed to the surfaces of the structural members 1 and 2 opposite to the circuit mounting surfaces. Let the circuit mounting surfaces of the structural members 1 and 2 and the surfaces opposite thereto be referred to as front surfaces and rear surfaces, respectively. In the illustrative embodiment, the structural elements 1 and 2 are 1.6 mm thick each while the hinges 7 are 2 mm thick each. Therefore, the aligned axes of the hinges 7 is spaced from the front surfaces of the structural members 1 and 2 by 3.6 mm.

The structural members 1 and 3 are also connected together by hinges 8. The circuit mounting surfaces of the structural members 1 and 3 and the surfaces opposite thereto will also be referred to as front surfaces and rear surfaces, respectively. The portions of the structural members 1 and 3 where the hinges 8 are affixed are positioned at an angle of 90 degrees relative to the front surfaces of the members 1 and 3. The aligned axes of the hinges 8 are spaced from the front surfaces of the structural members 1 and 3 by 15 mm in the vertical direction. The structural member 2 is rotatable about the hinges 7 counterclockwise relative to the structural member 1, as indicated by a dashed line in FIG. 1B. Therefore, the structural members 1 and 2 are foldable such that their rear surfaces face each other. The structural member 3 is also rotatable about the hinges 8 counterclockwise relative to the structural member 1, i.e., foldable such that the front surface of the former faces the front surface of the latter.

FIG. 1A shows the structural members 1–3 in an unfolded position. As shown, optical members 4, splices 5 and connectors 6 for external lines are mounted on the front surfaces of the structural members 1–3. The optical members 4 are interconnected by optical fibers 9. The optical fibers 9 and their extra length portions 10 are affixed to the structural members 1–3 by fiber retainers 11. The structural members 1 and 2 are formed with notches 12 facing each other and adjoining the hinges 7.

FIG. 2 shows the optical circuit mounting structure of FIG. 1 in a folded position. As shown, the structural members 1 and 2 are folded about the hinges 7 by 180 degrees from the unfolded position shown in FIG. 1. In this condition, the front surfaces of the structural members 1 and 2 are spaced by 7.2 mm which is twice as large as 3.6 mm mentioned earlier. Likewise, the structural members 1 and 3 are folded about the hinges 8 by 180 degrees from the position shown in FIG. 1. In the folded position, the front surfaces of the structural members 1 and 3 are spaced by 30 mm which is twice as large as 15 mm mentioned earlier. The distance of 30 mm successfully prevents the optical circuit arrangements provided on the structural members 1 and 2 from interfering with each other. When such an assembly is used, portions 21 and 22 included in the assembly are fastened by screws 23 and 24 so as to fix the relative position between the structural members 1–3. A protection cover 25 may be affixed to the top of the structural member 2, as needed.

In the folded position shown in FIG. 2, the fibers 9 extending over the structural members 1 and 2 are passed through the notches 12, FIG. 1, formed in the members 1 and 2. Specifically, in the unfolded position shown in FIG. 1, the notches 12 face each other, forming a single rectangular hole in combination. However, when the structural members 1 and 2 are folded about the flanges 7, as shown in FIG. 2, the two notches 12 overlap each other and allow the fibers 9 to move back and forth between the front surfaces of the members 1 and 2 via the notches 12. Because the required length of the fibers 9 does not increase at the time of folding or unfolding, the fibers 9 are free from excessive tension. In addition, only if an arrangement is so made as to prevent the radius of curvature of the fibers 9 from decreasing below a preselected value, the structural members can be folded and unfolded with the fibers 9 connected together.

To prevent the radius of curvature of the fibers 9 from decreasing below a preselected value, the assembly should only be designed such that the fibers 9 extend over the adjacent structural members 1 and 2 and the adjacent structural members 1 and 3 while intersecting the axes of the hinges 7 and 8 at an acute angle. In the actual design stage, the structural members 1–3 in the unfolded position, FIG. 1A, can be considered to be a single mounting surface only if the angle of the fibers 9 relative to the members 1–3 are taken account of. In assemblage, the structural members 1 and 2 and the structural members 1 and 3 are respectively connected by the hinges 7 and 8 and then laid in the flat position shown in FIG. 1. Subsequently, the optical parts 4, fibers 9 and so forth are mounted to the structural members 1–3. After adjustment and basic tests, the structural members 1–3 are folded, as shown in FIG. 2, and then affixed together at the portions 21 and 22 by the screws 23 and 24.

Figure 3:
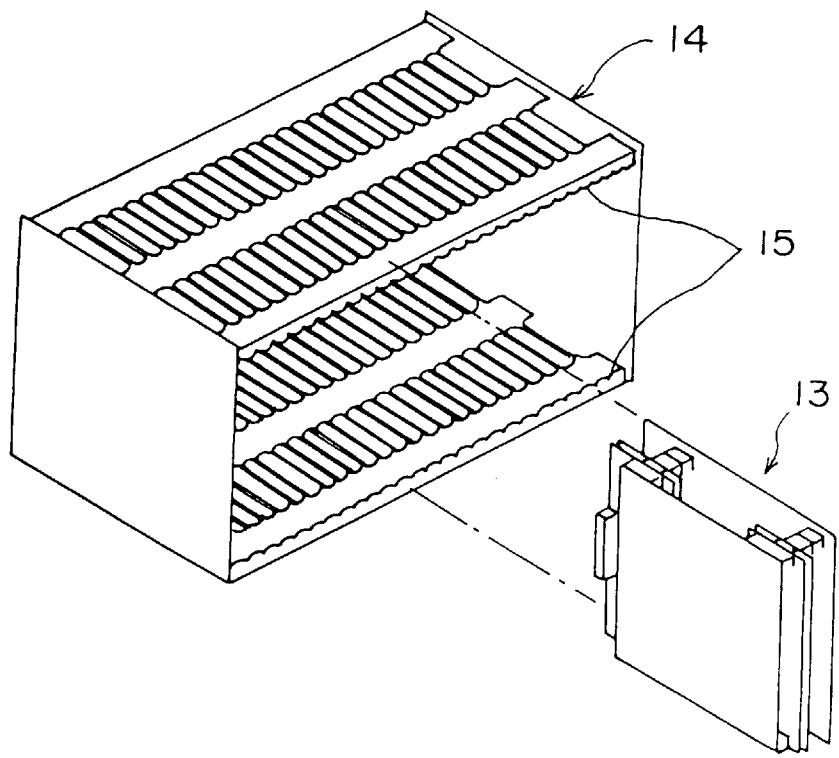
FIG. 3 is a perspective view showing how the embodiment is mounted to a shelf.

FIG. 3 shows a shelf 14 for mounting the above optical circuit mounting structure. As shown, an optical circuit 13 folded and affixed by the above procedure is inserted into the shelf 14 along guides 15 formed in the shelf 14. The electrical connection of the optical circuit 13 is implemented by a conventional plug-in scheme.

Figures 4A, 4B, 4C:
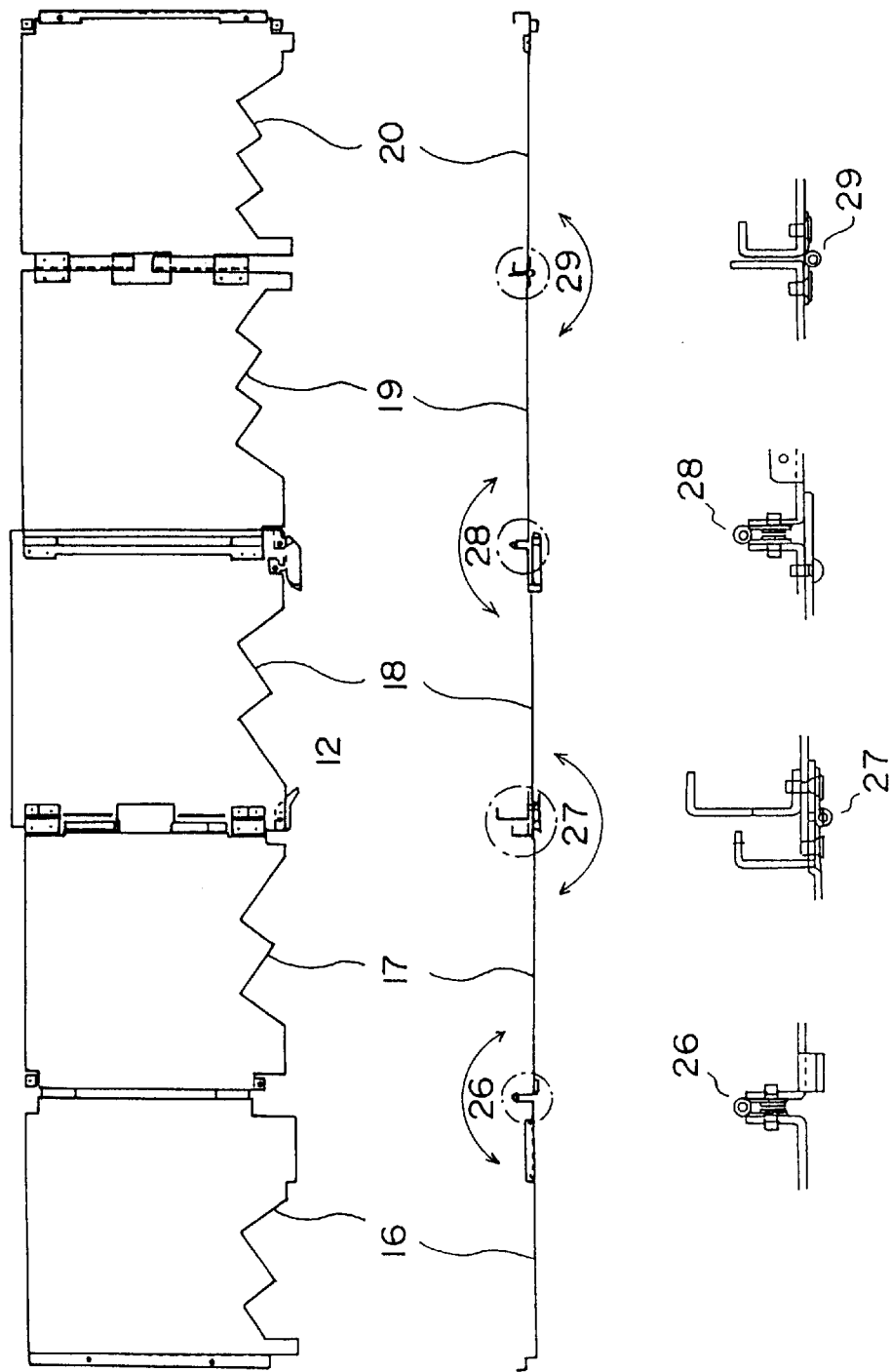
FIGS. 4A and 4B are respectively a plan view and a front view showing an alternative embodiment of the present invention in an unfolded position.
FIG. 4C is an enlarged view of a hinge structure included in the alternative embodiment.
Figure 5:
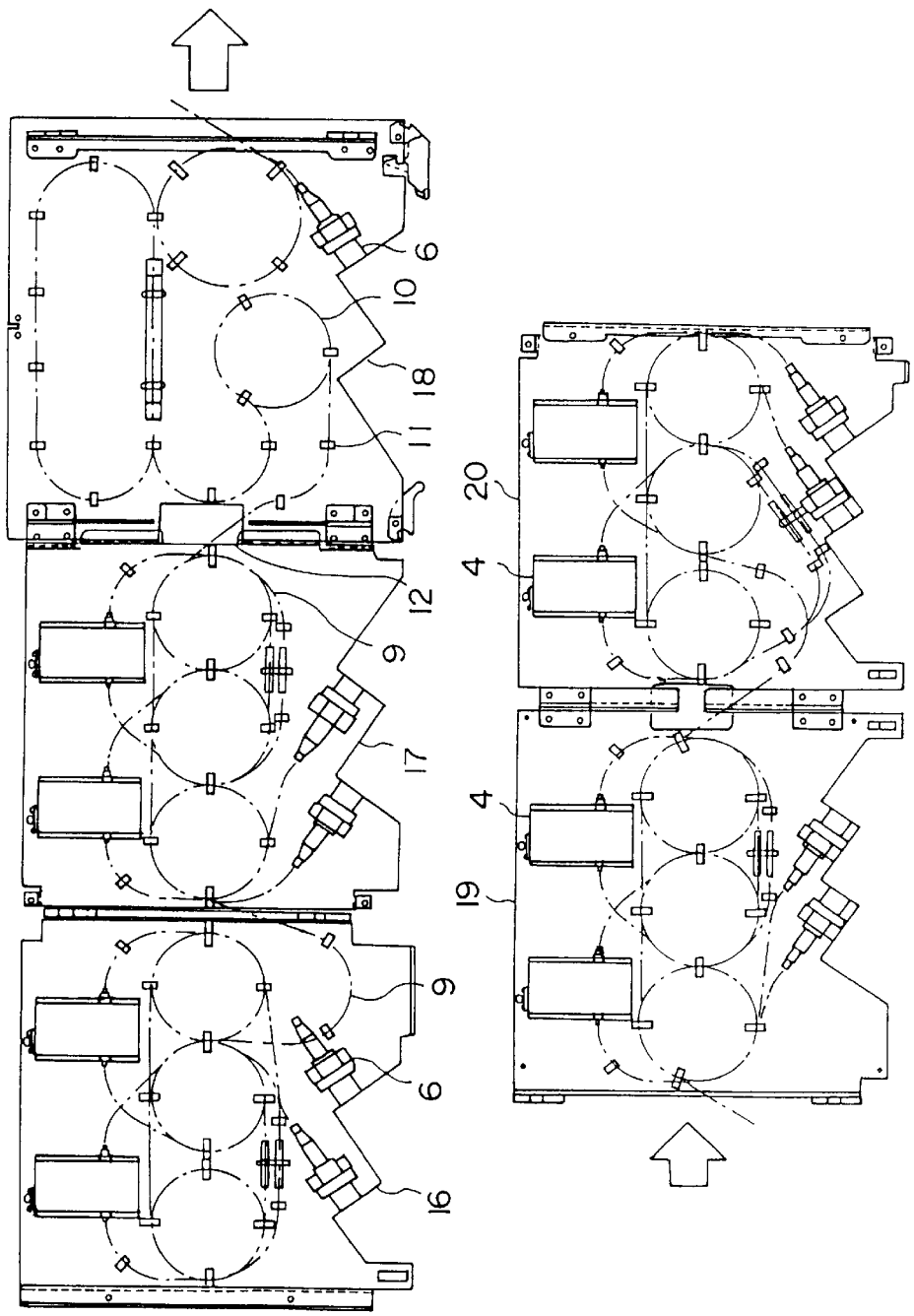
FIG. 5 is a plan view showing an optical circuit mounted on the alternative embodiment.
Figure 6A:
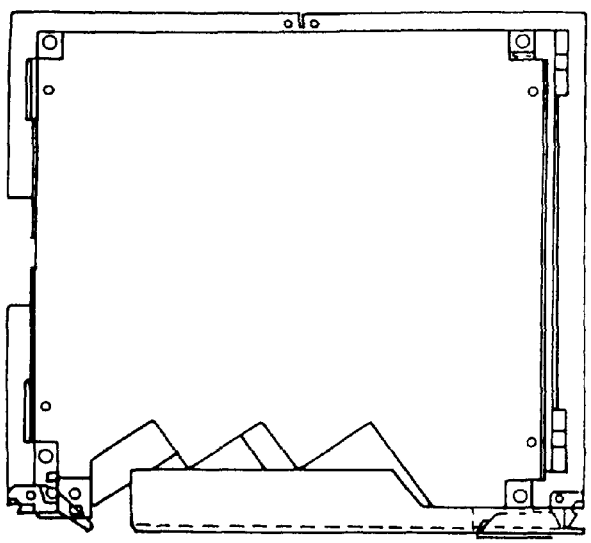
FIGS. 6A–6C show how the alternative embodiment is folded.
Figure 6B:
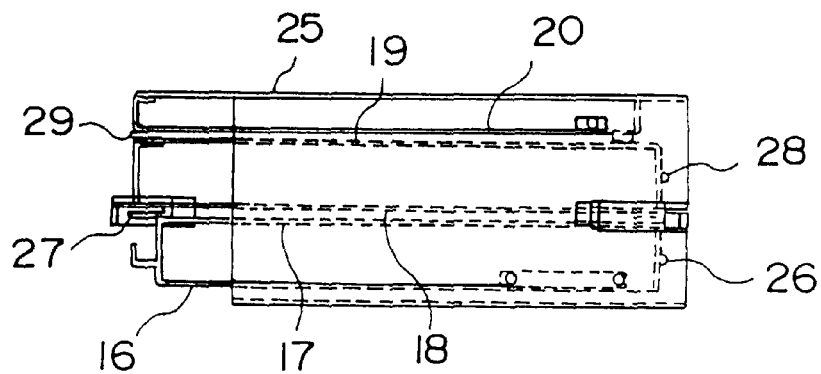
Figure 6C:
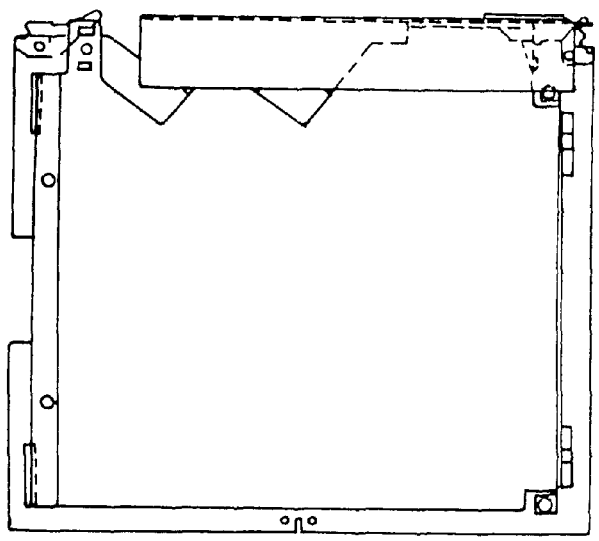

Referring to FIGS. 4–6, an alternative embodiment of the present invention is shown. As shown, an optical circuit mounting structure includes five separate structural members 16, 17, 18, 19 and 20 forming five circuit mounting surfaces or front surfaces. The structural members 16 and 17, structural members 17 and 18, structural members 18 and 19 and structural members 19 and 20 are respectively connected together by hinges 26, 27, 28 and 29. As shown in FIG. 4A, the front surfaces of the structural members 16–20 face the same side when the members 16–20 are unfolded. FIGS. 4B and 4C demonstrate how the structural members 16–20 are folded. As shown, the structural members 16 and 17 are folded about the hinges 26 such that their front surfaces face each other. The structural members 17 and 18 are folded about the hinges 27 such that their rear surfaces opposite to the front surfaces face each other. The structural members 18 and 19 are folded about the hinges 28 such that their front surfaces face each other. Further, the structural elements 19 and 20 are folded about the hinges 29 such that their rear surfaces face each other. The contour of the folded structure has small dimensions, as shown in FIGS. 6A–6C. As shown in FIG. 4C, the hinges 26–29 each has its axis spaced from the front surfaces of the adjoining structural members in order to form a preselected clearance between the structural members.

FIG. 5 shows the structural members 16–20 in the unfolded position and the circuit parts 4, fibers 9 and so forth mounted thereto. The structural members 17 and 18 are formed with the notches 12 facing each other. Likewise, the structural members 19 and 20 are formed with notches 12 facing each other. When the structural members 17 and 18 and the structural members 19 and 20 are folded, their notches 12 overlap each other and allow the fibers 9 to be passed therethrough. The fibers 9 extending over the adjacent structural members are designed to intersect the aligned axes of the associated one of the hinges 26–29 at an arcuate angle.

Various modifications will become possible for those skilled in the art after receiving the teachings of the present disclosure without departing from the scope thereof. For example, in the illustrative embodiments, the structural members are positioned such that the axes of all the hinges extend parallel to each other. Alternatively, the axes of some hinges may extend perpendicularly or at any other suitable angle to each other. For example, a single rectangular structural member may be provided with hinges on one horizontal side and one vertical side. In such a case, two other structural members substantially identical in shape may be connected to the above structural member by the flanges in a foldable configuration.

What is claimed is:

1. A structure for mounting an optical circuit, comprising:
   a plurality of separate structural members for mounting and affixing optical parts and optical fibers; and
   a plurality of hinges foldably connecting said plurality of structural members;
   wherein when said plurality of hinges are opened, said optical parts and said optical fibers are positioned on surfaces of said plurality of structural members lying in a same plane; and
   wherein said optical fibers intersect axes of said plurality of hinges at an acute angle at positions where said plurality of hinges connect said plurality of structural members.

2. A structure as claimed in claim 1, wherein said plurality of structural members comprise at least three structural members connected in such a manner as to include an upward fold and a downward fold.

3. A structure as claimed in claim 1, wherein said plurality of structural members comprise at least three structural members, wherein said plurality of hinge have axes extending parallel to each other, wherein said plurality of structural members are positioned in an array when said plurality of hinges are opened, and wherein an upward fold and a downward fold alternate with each other when said hinges are closed.

4. A structure as claimed in claim 1, wherein when said plurality of hinges are closed, said plurality of structural members are parallel to each other while being spaced by a preselected clearance, and wherein said plurality of structural members include a structure for affixing said plurality of structural members to each other.

5. A structure as claimed in claim 1, wherein said plurality of hinges have axes spaced by a preselected distance from and perpendicularly to surfaces of said plurality of structural members for mounting said optical parts and said optical fibers.

6. A structure as claimed in claim 1, wherein said plurality of structural members have a substantially square configuration and formed with notches in sides thereof adjoining said plurality of hinges.

7. A structure for mounting an optical circuit, comprising:
   a plurality of separate structural members for mounting and affixing optical parts and optical fibers, said plurality of structural members comprising at least three structural members connected in such a manner as to include an upward fold and downward fold;
   a plurality of hinges foldably connecting said plurality of structural members;
   at least two of said at least three structural members having notches in sides thereof adjoining said plurality of hinges for allowing the optical fibers to pass therethrough;
   wherein when said plurality of hinges are opened, said optical parts and said optical fibers are positioned on surfaces of said plurality of structural members lying in a same plane and said notches are facing each other, and when said plurality of hinges are closed, said notches are overlapping each other.

* * * * *